United States Patent [19]

Bolang

[11] Patent Number: 4,473,317
[45] Date of Patent: Sep. 25, 1984

[54] ANTI-BACKLASH MECHANISM FOR A SPLINE CONNECTION

[75] Inventor: Per A. Bolang, Bellevue, Wash.

[73] Assignee: The Boeing Company, Seattle, Wash.

[21] Appl. No.: 275,824

[22] Filed: Jun. 22, 1981

[51] Int. Cl.³ .......................... B25G 3/28; F16B 3/00
[52] U.S. Cl. ...................................... 403/359; 74/440
[58] Field of Search .................. 403/359; 74/440, 409; 411/80

[56] References Cited

U.S. PATENT DOCUMENTS

| | | | |
|---|---|---|---|
| 2,896,465 | 7/1959 | Armitage et al. | 74/409 |
| 2,905,008 | 9/1959 | Sears | 74/409 |
| 2,936,625 | 5/1960 | Heiseler | 74/1 |
| 3,090,641 | 5/1963 | Eminger | 287/53 |
| 3,360,961 | 1/1968 | Steiner | 403/359 X |
| 3,399,549 | 9/1968 | Nagele | 64/23 |
| 3,410,111 | 11/1968 | Ireland | 64/9 |
| 4,303,149 | 12/1981 | Lech, Jr. | 403/359 X |

FOREIGN PATENT DOCUMENTS 1342043  9/1963  France .

*Primary Examiner*—Andrew V. Kundrat
*Attorney, Agent, or Firm*—Christensen, O'Connor, Johnson & Kindness

[57] ABSTRACT

A mechanism for reducing backlash in a spline connection between cooperably splined male and female members is disclosed. One of the members, either male or female, is formed in two coaxially alignable splined segments. The splined segments have end surfaces that are shaped to engage in sliding relationship so as to cause the two segments to undergo relative rotation when the segments are subjected to a relative axial load. The mechanism includes a connecting device for subjecting the two segments to such a relative axial load. In operation, the two splined segments are first oriented with their splines in alignment and are engaged as a unit with the other splined member. The connecting device is then applied to subject the two segments to a relative axial load so as to cause the segments to rotate out of alignment with one another and thereby securely engage the splines of the segmented member with the splines of the other member. The mechanism provides a secure, backlash-free spline connection that may be readily disassembled and reassembled in the field without any special tools or facilities.

37 Claims, 17 Drawing Figures

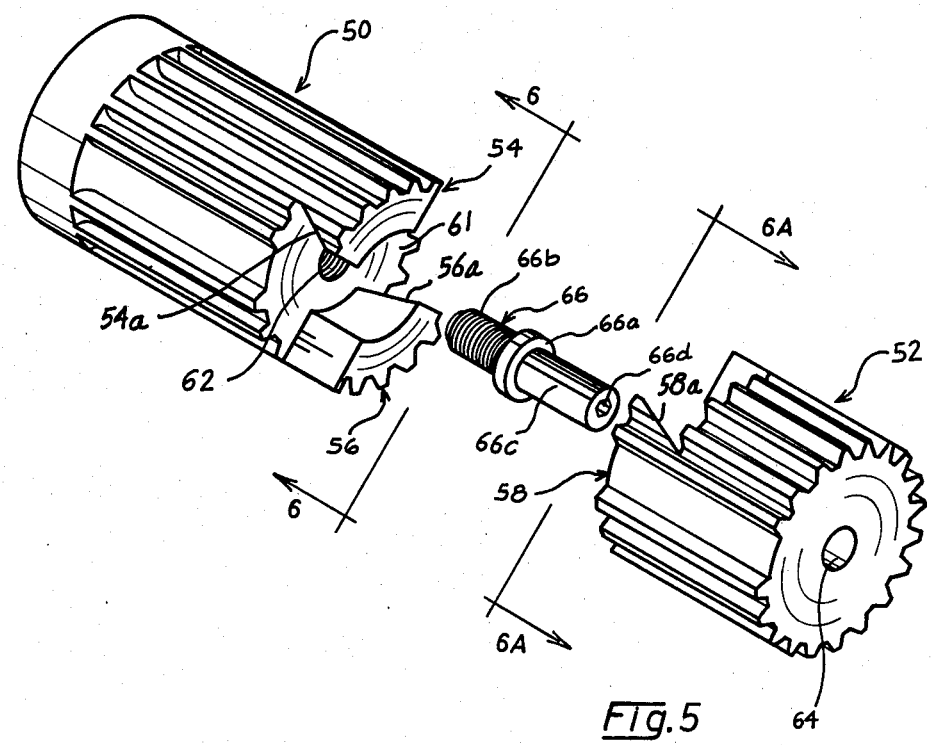
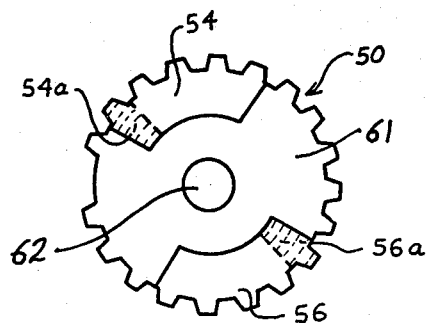
Fig.6
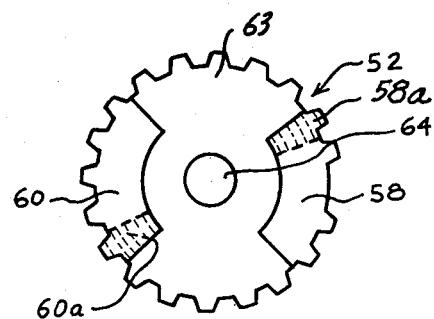
Fig. 6A

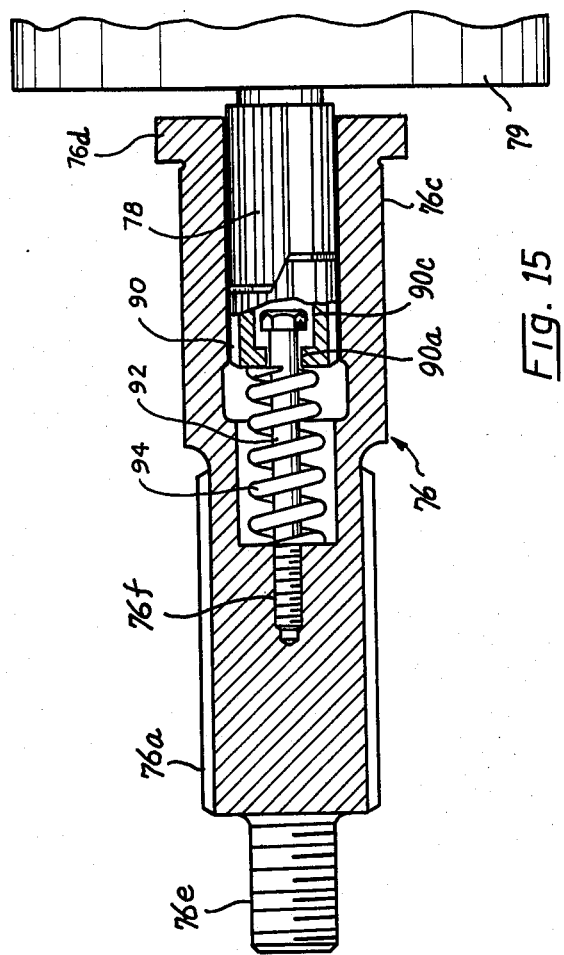

ANTI-BACKLASH MECHANISM FOR A SPLINE CONNECTION

BACKGROUND OF THE INVENTION

The present invention relates generally to spline connections wherein a splined male member, such as a splined shaft, is engaged with a splined female member, for example, a hub or gear wheel having a splined central bore. More particularly, the invention relates to anti-backlash mechanisms for such spline connections.

The suppression or avoidance of backlash is an essential consideration in the design of mechanical linkages having spline connections. Backlash, or play in the spline connection, results in deterioration of the splines in any spline connection that is subjected to substantial mechanical loads. Such deterioration typically accelerates as the amount of backlash in the spline connection increases.

Backlash poses another type of problem in mechanical control linkages that are under automatic feedback control. Such linkages are used, for example, in airfoil control systems in airplanes. The presence of backlash in spline connections in such linkages results in an unstable feedback condition that causes uncontrolled "hunting" of the system.

Without some type of anti-backlash mechanism, a spline connection normally has some backlash, even under close tolerance conditions. In applications where the purpose of the spline connection is to accommodate relative axial sliding motion between the connected members, some backlash is virtually unavoidable if there is to be provided sufficient radial clearance to allow free axial sliding between the members. However, even in other applications where relative axial sliding need not be accommodated and there is merely sought a tight, torque-transmitting connection that can be readily disassembled and reassembled, backlash is a problem because at least some minimal radial clearance must be provided between the splined male and female members in order to allow for their initial assembly and subsequent disassembly. It is to the latter applications that the present invention is directed.

In one type of previously known anti-backlash mechanism, a shaft having splines at one end is provided with a relatively large diameter axial bore extending inwardly from the splined end of the shaft, such that the splined portion of the shaft is essentially tubular in configuration. The splined tubular portion of the shaft is further provided with several longitudinal slots passing through the tubular wall of the shaft and extending along the splined portion of the shaft. The slots divide the tubular end of the shaft into a set of deflectable, splined fingers. The splined portion of the shaft, including the deflectable fingers, is inserted into a splined female member and a tapered plug is driven into the bore of the tubular shaft from the opposite side of the female member. The plug drives the splined fingers radially outwardly to securely engage the splines of the female member.

There are several disadvantages to the above-described prior art mechanism, however. For example, the splined fingers are necessarily somewhat flexible and thereby introduce some torsional flexibility into the splined shaft. Thus, although spline backlash is eliminated, a similar problem of torsional flexibility is introduced. This torsional flexibility is aggravated by the fact that it is primarily only the ends of the fingers of the splined shaft, which are in direct contact with the tapered plug, that are driven outwardly to securely engage the splines of the female member, leaving the backlash unrestricted along most of the length of the splined shaft. Another disadvantage is that the mechanism can only be employed in situations where there is sufficient access to the end of the splined shaft to permit the plug to be manually inserted and seated. Further, subsequent disassembly of the spline connection by removal of the tapered plug is relatively difficult.

In another previous approach to the problem of backlash, the splined shaft is tapered such that it can be driven axially into a splined female member that is cooperably tapered to receive the splined shaft. In a related prior art approach, a standard tapered key is driven into a keyway between the splined members to bind them together. With each of these two approaches, however, subsequent disassembly of the parts is difficult, particularly where servicing and maintenance must be carried out in the field in the absence of machine shop facilities.

Accordingly, it is the general object and purpose of the present invention to provide a mechanism for eliminating backlash in a spline connection.

It is also an object of the present invention to provide a mechanism for locking cooperably splined male and female members together with no backlash between them.

It is another object of the present invention to provide a mechanism that eliminates backlash between splined members and which also allows ready disassembly and reassembly of the splined members, particularly in the field and without necessity of special tools or facilities.

It is yet another object of the present invention to provide an anti-backlash mechanism that takes up no additional space beyond that ordinarily occupied by a conventional spline connection. It is another object to provide such an anti-backlash mechanism that is simple and reliable in design and operation.

SUMMARY OF THE INVENTION

In accordance with the present invention, a splined member, either male or female, is formed in two coaxially alignable splined segments. The two splined segments include opposing end surfaces that are shaped to assume a sliding relationship when the two segments are drawn together in axial alignment (or, alternatively, drawn apart, as described further below). The slidably engaged end surfaces cause the splined segments to undergo relative rotation as the segments are drawn together (or drawn apart). A suitable connecting device is employed to draw the segments together (or apart) with a selected amount of force sufficient to obtain a desired relative rotation of the segments. Such rotation causes the splines of the two segments to rotate out of axial alignment and thereby take up any backlash between the segmented splined member and a mating splined member.

In operation, the segmented splined member is first loosely mated with a splined mating member of conventional configuration. For this purpose, the segments of the segmented splined member are disposed with their splines in alignment as the segmented member is assembled with the mating splined member. The segments of the segmented member are then drawn together (or apart) with the connecting device. The resulting relative rotation of the two splined segments forces their splines out of alignment and thereby locks the splines of the segmented member to the splines of the mating second member, thus eliminating any backlash between the two members.

For example, in accordance with the invention, a conventional splined male member may be formed in two segments; a splined shaft and a similarly splined plug. The opposing ends of the shaft and plug are provided with cooperable cam surfaces that are shaped to engage in sliding relationship when the shaft and plug are pressed together in axial alignment. The cooperably engageable cam surfaces are oriented in generally helical configurations so as to cause the shaft and plug to undergo relative rotational motion as they are drawn together. As a result of such rotation, the splines of the shaft and plug are rotated from an aligned state to a misaligned state. A bolt or other connecting means is employed to draw the shaft and plug axially together in coaxial alignment. The shaft and plug are inserted as a unit in a female member. When the bolt is tightened, the cam surfaces engage and cause the shaft to rotate slightly relative to the plug, thereby securely locking the misaligned splines of the shaft and plug to the splines of the female member, to eliminate any backlash between the segmented male member and the female member.

In an alternative embodiment of the invention, the opposing helical cam surfaces of the segmented members are shaped such that the segments may be rotatably assembled in an axially interlocking relationship, and whereby the segments rotate when drawn axially apart, rather than forced together. In one such embodiment a splined shaft and a splined plug are forced apart by means of a collared stud that is interposed between the shaft and the plug. The stud is threaded into a bore in the end of the splined shaft and extends into an unthreaded bore in the plug. The stud includes an integral collar located between the shaft and the plug. By screwing the stud out of the threaded bore of the splined shaft, the collar of the stud abuts the plug and drives it away from the shaft, thereby causing the plug and shaft to undergo relative rotation due to the sliding engagement of the cam surfaces. The advantage of this embodiment of the invention is that the plug and the collared stud cannot be removed or dislodged from a splined female member in the event the stud works loose or is inadvertently left untightened, since the rotatively interlocking cam surfaces prevent direct axial separation of the plug from the shaft.

In another aspect of the invention, the means connecting the splined segments includes a spring bias in which the segments are allowed to yield in relative rotation under high torque loads. With such a spring biasing between the splined member segments, it will be seen that backlash is not altogether eliminated, but rather is replaced with an essentially spring-loaded antibacklash mechanism. In this embodiment the response of the spline connection to high torque loads depends on the spring constant of the spring biasing means as well as the relative slopes of the cam surfaces of the plug and shaft.

BRIEF DESCRIPTION OF THE DRAWINGS

FIG. 5 is an exploded isometric view of an alternative embodiment of a splined male member constructed in a segmented assembly accordance with the present invention and including a splined shaft and splined plug having negatively sloped cam surfaces;

FIGS. 6 and 6A are end views of the splined shaft and splined plug of the alternative embodiment illustrated in FIG. 5, taken along section lines 6—6 and 6A—6A, respectively, of FIG. 5;

FIG. 15 is a cross-sectional assembly view of the drum shaft and splined plug asembly of FIG. 14.

DETAILED DESCRIPTION OF THE PREFERRED EMBODIMENT

FIGS. 1 through 4 illustrate a preferred embodiment of a segmented, splined male member that is constructed in accordance with the present invention. In practice, the illustrated segmented member takes the place of a conventional, single-piece splined shaft. As such, the segmented member is engageable with a conventionally splined female member to form a backlash-free spline connection in the manner further described below.

Figure 1:
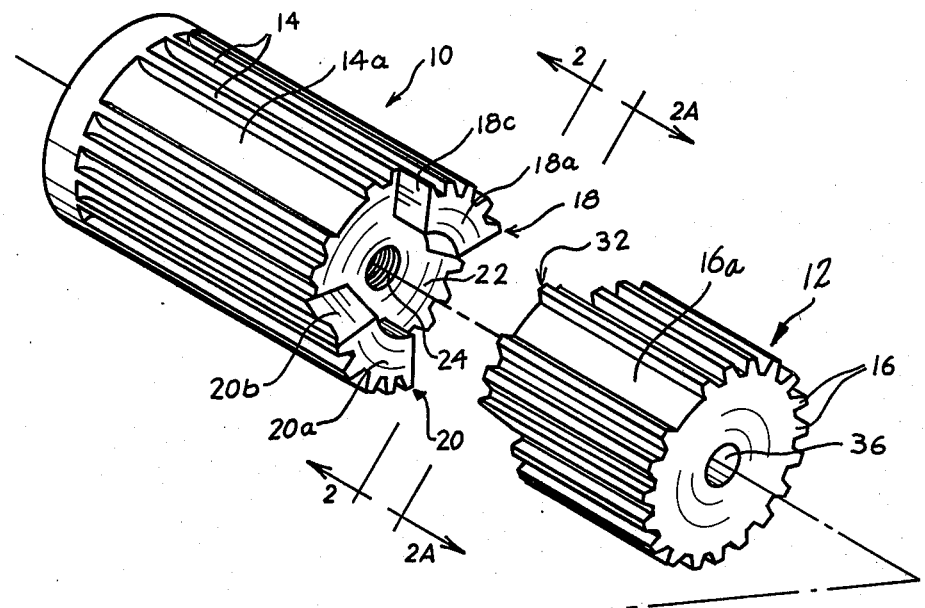
FIG. 1 is an exploded isometric view of a preferred embodiment of a splined male member constructed in accordance with the present invention so as to include a splined shaft and splined plug.
Figures 2, 2A:
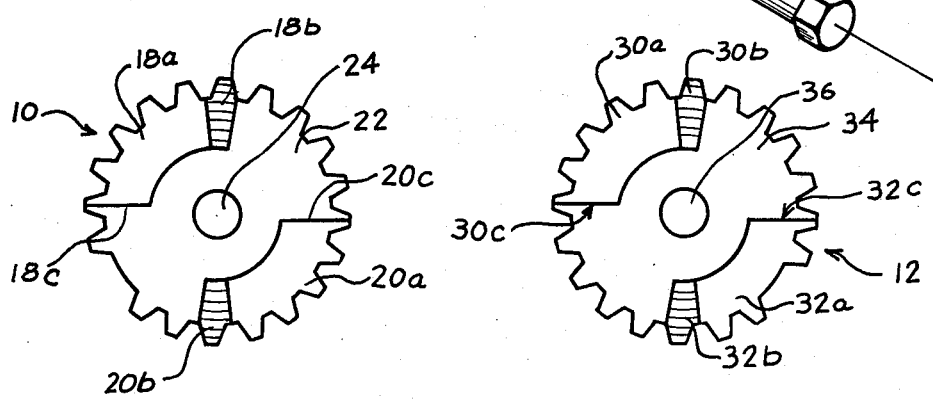
FIGS. 2 and 2A are end views of the splined shaft and splined plug of FIG. 1, taken along section lines 2—2 and 2A—2A, respectively, of FIG. 1.

Referring first to FIG. 1, the segmented male member includes a splined shaft 10 and a generally cylindrical splined plug 12. The shaft 10 and the plug 12 each have a plurality of splines, 14 and 16 respectively. The shaft 10 and the plug 12 are coaxially alignable with one another with their splines in alignment so as to present a segmented male member for engagement with a conventional female splined member. One spline is removed from the shaft 10 and the plug 12 along portions designated 14a and 16a, respectively, to permit indexing of the shaft 10 and plug 12 with one another, and to permit indexing of both the shaft 10 and the plug 12 with a splined female member having a filled indexing groove. Such indexing is necessary to ensure proper engagement of the shaft 10 and the plug 12, as further described below.

The splined shaft 10 and the splined plug 12 have opposing end surfaces that are formed to abut in axial and circumferential sliding relationship when the shaft 10 and plug 12 are drawn together axially. More specifically, the end of the splined shaft 10 is machined to form a pair of integral, arcuate lugs 18 and 20. The lugs 18 and 20 extend as raised elements from the outer periphery of a planar, transversely oriented end surface 22 of the shaft 10. The shaft 10 further includes a threaded axial bore 24 that opens on the center of the planar end surface 22. The lugs 18 and 20 are positioned diametrically with respect to one another across the end of the shaft 10 and on opposite sides of the threaded bore 24.

The lugs 18 and 20 have outer circumferential surfaces that are axially continuous with the outer cylindrical surface of the shaft 10, and which include continuous extensions of the splines 14. The lugs 18 and 20 further include planar end surfaces 18a and 20a, respectively, which are coplanar and which are generally parallel to the planar end surface 22 of the shaft 10. The lugs 18 and 20 further include helically contoured cam ramp surfaces 18b and 20b, respectively. The cam surface 18b extends from the lug end surface 18a to the shaft end surface 22 at one end of the arcuate lug 18. Likewise, the cam surface 20b extends from the surface 20a of lug 20 to the planar end surface 22 of the shaft 10. The cam surfaces 18b and 20b each intersect the end surface 22 of the shaft 10 at an obtuse angle. The cam surfaces 18b and 20b are positioned at opposite ends of the lugs 18 and 20, respectively, so as to be symmetrically and diametrically opposed across the central axis of the shaft 10. The helical contours of the cam surfaces 18b and 20b have a low pitch angle, that is, they are oriented so as to extend at a small angle with respect to the axis of the shaft 10. As a result, the cam surfaces 18b and 20b appear almost as planar surfaces in the drawings.

The lugs 18 and 20 further include planar surfaces 18c and 20c, respectively, which are cut longitudinally and radially with respect to the central axis of the shaft 10. The surface 18c extends from the lug end surface 18a to the shaft end surface 22 at the opposite arcuate end of the lug 18 from the helically contoured cam surface 18b. The surface 20c correspondingly extends from the lug end surface 20a to the shaft end surface 22. The surfaces 18c and 20c are thus parallel to one another and are also parallel to the central longitudinal axis of the shaft 10. Further, the surfaces 18c and 20c are offset from one another on opposite sides of the central axis of the shaft 10, such that they lie in planes which pass chordwise through the shaft 10, i.e., do not intersect the shaft axis.

The splined plug 12 likewise includes integral lugs 30 and 32 that are essentially identical to the lugs 18 and 20 of the shaft 10, and which are formed to cooperably mate with the lugs 18 and 20. More specifically, the lugs 30 and 32 extend from a planar plug end surface 34 and are diametrically positioned with respect to one another across the end surface 34. The lugs 30 and 32 include coplanar end surfaces 30a and 32a that are parallel to the end surface 34; helically contoured can surfaces 30b and 32b that are cooperably engageable against the cam surfaces 18b and 20b respectively, of the lugs 18 and 20, and; longitudinally cut, planar surfaces 30c and 32c that are parallel to one another and offset from one another on opposite sides of the central axis of the plug 12.

The plug 12 includes a central axial bore 36. The shaft 10 and the plug 12 are connected by a bolt 38 that passes through the bore 36 of the plug 12 and is threadably engageable in the threaded bore 24 of the shaft 10. The bolt 38 is threaded into the bore 24 of the splined shaft 10 to draw the plug 12 axially to the shaft 10. Preferably, a belleville washer 40 is employed on the bolt 38 to provide a spring bias. The torque with which the bolt 38 is applied may be varied as desired to obtain a predetermined level of connecting force.

The lugs 18 and 20 of the shaft 10, and the lugs 30 and 32 of the plug 12, are oriented such that the helically contoured cam surfaces 18b and 20b slidably engage the helically contoured cam surfaces 30b and 32b, respectively, when the plug 12 is bolted to the end of the shaft 10. The sliding relationship between the cam surfaces of the lugs causes the plug 12 and shaft 10 to undergo relative rotation as the plug 12 is bolted to the shaft 10.

The longitudinally cut end surfaces 18c and 20c, as well as the analogous longitudinally cut end surfaces 30c and 32c, are preferably offset from one another by an angle greater than the maximum angle of rotation of the plug 12 with respect to the shaft 10. Consequently, the shaft 10 and the plug 12 may be fully connected, with the respective end surfaces 18a and 20a brought into contact with the plug end surface 34, and the surfaces 30a and 32a brought into contact with the surface 22, without causing the end surface 18c to abut the end surface 32c, or the end surface 20c to abut the end surface 30c. In most cases, however, the shaft 10 and the plug 12 are not brought fully together. Rather, it is usually sufficient, and preferable, for the shaft 10 and the plug 12 to be connected such that there is a gap between the shaft 10 and plug 12 as shown in FIG. 4.

Figure 3:
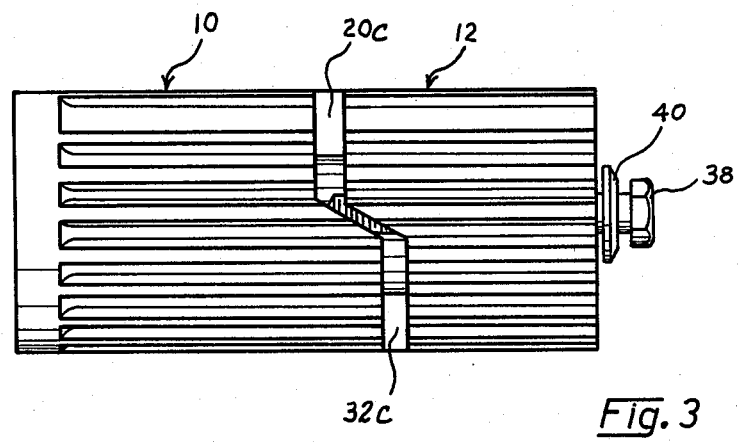
FIG. 3 is a side view of the segmented assembly of FIG. 1, with the splined shaft and splined plug slightly spaced and their splines aligned in preparation for insertion into a female splined member.

Referring to FIG. 3, the splines 14 of the shaft 10 and the splines 16 of the plug 12 are oriented with respect to the lugs 18, 20, 30 and 32 such that, with the splines 14 and 16 circumferentially aligned, the lugs 18 and 20 of the shaft 10 may be brought into contact with the lugs 30 and 32 of the plug 12 such that only a portion of the cam surfaces 18b and 20b are in contact with corresponding portions of the cam surfaces 30b and 32b. This enables the opposing cam surfaces to slide over each other to effect relative rotational motion of the splined shaft and plug, as illustrated in FIG. 3.

Figure 4:
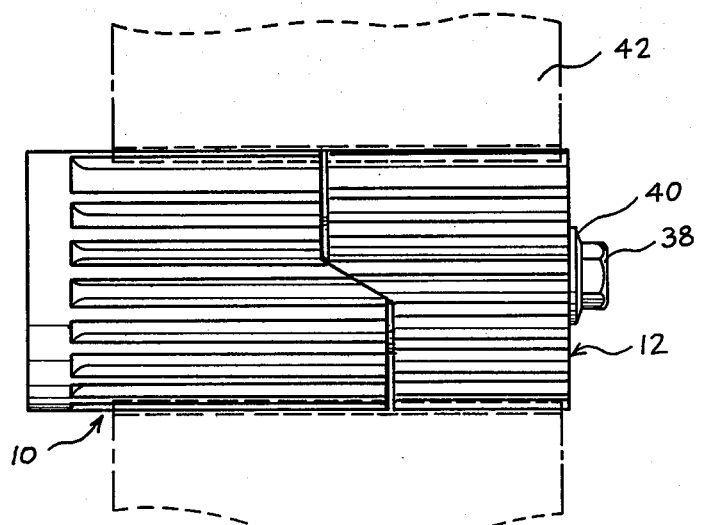
FIG. 4 is a side view of the spline assembly of FIG. 1 as finally installed in a cooperably splined female member and drawn together to slightly misalign the splines of the shaft and the plug.

With the splines 14 and 16 aligned, the shaft 10 and the plug 12 may be loosely assembled, as shown in FIG. 3, for engagement with a female splined member 42, illustrated in phantom outline in FIG. 4. In this regard, it is noted that the female member 42 includes a filled indexing groove (not shown) that indexes the shaft 10 with the plug 12 by means of their missing splines 14a and 16a. Subsequent drawing of the plug 12 to the shaft 10 be means of the bolt 38 results in rotation of the splines 14 and 16 out of alignment with one another, to thereby securely lock the shaft 10 and plug 12 to the splined female member 42. The splined female member 42 may be, for example, a splined drum, wheel, or gear. It will be understood that the splines 14 of the shaft 10 are urged in one direction against the splines of the female member 42, whereas the splines 16 of the plug 12 are urged in the opposite rotational direction against the splines of the female member 42.

The helically contoured cam surfaces 18b and 20b (and 30b and 32b) are preferably formed with a right-hand helical curve, as shown in FIGS. 1 through 4. More specifically, the cam surfaces are preferably of the same "handedness" as a conventional bolt 38, i.e., of a right-hand twist configuration. In this manner, the rotation of the plug 12 with respect to the shaft 10 that occurs when the plug is drawn toward shaft 10 is in the same relative direction as is the rotation of the bolt 38 used to draw plug 12 against the shaft 10. The rotation of the plug 12 with respect to the shaft 10 is thus facilitated by, rather than opposed by, tightening of the bolt 38 with a right-hand twisting force.

In a somewhat simpler version of the embodiment illustrated in FIGS. 1 through 4, planar cam surfaces may be substituted for the helically contoured surfaces 18b and 20b (and 30b and 32b) described above. Planar cam surfaces, provided they are of the same general slope and orientation as the helically curved surfaces described above, are less expensive to mill and are substantially as effective as true helically curved surfaces for most applications. The helical curvature is preferred, however, because it is the only contour that ensures a flush surface contact between the opposing cam surfaces.

In operation of the embodiment illustrated in FIG. 4, the plug 12 is loosely bolted to the shaft 10 such that the splines 14 and 16 are in general alignment, as illustrated in FIG. 3. The loosely combined shaft 10 and plug 12 are then inserted as a unit into one end of the female splined member 42 shown in phantom outline in FIG. 4. The bolt 38 is then tightened and the shaft 10 and plug 12 are drawn together. The resulting rotation of the shaft 10 and plug 12 securely locks both shaft 10 and the plug 12 to the female splined member 42. In this regard, the torque applied to the bolt 38 is related to the torque obtained between the shaft 10 and the plug 12 by factors that include the curvature, or slope, of the helically contoured cam surfaces 18b and 20b (and 30b and 32b), as well as the pitch of the threads on the bolt 38.

The slope, or pitch, of the helically contoured cam surfaces shown in FIGS. 1 through 4, as well as that of the functionally analogous cam surfaces of the embodiments described below, may be varied to achieve desired levels of locking torque. It is noted that the slopes of the cam surfaces are generally exaggerated in FIGS. 3 and 4 for the purpose of illustration and to facilitate understanding of their function.

FIGS. 5 through 8 illustrate an alternative embodiment of a splined male member constructed in a segmented assembly in accordance with the present invention. A splined shaft 50 and a splined plug 52 include pairs of integral lugs 54 and 56, and 58 and 60, respectively. The splined shaft 50 includes an end surface 61 and a threaded axial bore 62, and the splined plug 52 includes an end surface 63 and an unthreaded axial bore 64. The lugs 54 and 56 of the splined shaft 50 include helically contoured cam surfaces 54a and 56a. The lugs 58 and 60 of the plug 52 include corresponding cam surfaces 58a and 60a, respectively.

The principal difference between the alternative embodiment illustrated in FIGS. 5 through 8 and the previously described embodiment illustrated in FIGS. 1 through 4 is that the cam surfaces of this alternative embodiment intersect the respective end surfaces 61 and 63 at an acute angle, rather than an obtuse angle, so that when the plug 52 and shaft 50 are assembled in an axially aligned, rotatively engaged relation, the opposing ends are axially interlocked. In this regard, the cam surfaces 54a, 56a, 58a and 60a are hereinafter designated as negatively sloped. One consequence of the negatively sloped cam surfaces is that the splined shaft 50 and the splined plug 52 are driven to undergo mutual relative rotation as the plug 52 is drawn away from the shaft 50, rather than as the plug is urged toward the shaft, as in the embodiment of FIGS. 1 through 4. Another consequence is that the lugs 54 and 56 of the shaft 50 axially interlock with the lugs 58 and 60 of the plug 60 so as to prevent direct axial separation of the shaft and the plug, as further described below.

The plug 52 is drawn apart from the splined shaft 50 by means of a stud 66 having an integral collar 66a in its midsection. The stud 66 is threaded at one end 66b and is unthreaded at its opposite end 66c. The stud 66 further includes an allen wrench socket 66d extending into the unthreaded end 66c.

Figure 7:
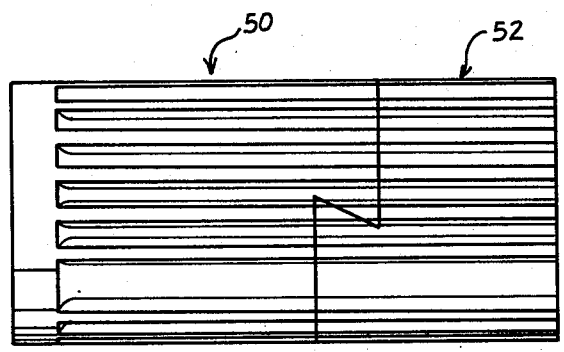
FIG. 7 is a side view of the alternative embodiment of FIG. 5, with the splined shaft and plug fully interlocked to align their splines for insertion into a splined female member.
Figure 8:
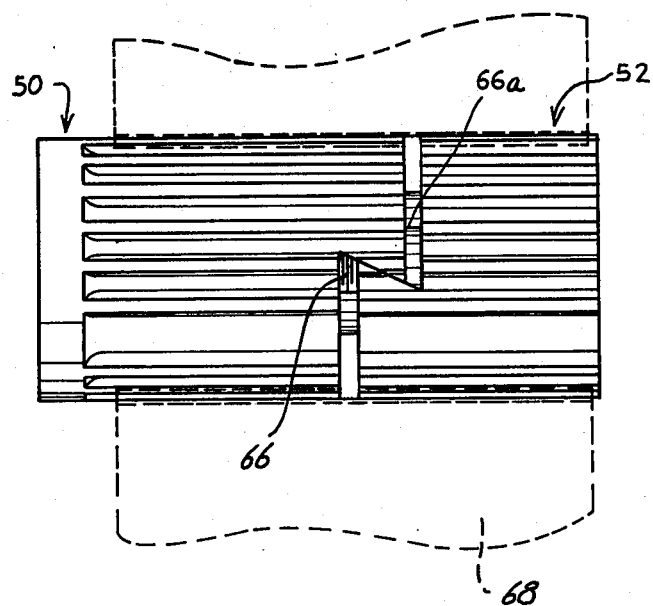
FIG. 8 is a side view of the alternative embodiment of FIG. 5, with the shaft and plug drawn apart to rotate their splines out of alignment to thereby lock the segmented male member to a splined female member.

In practice, the segmented male member illustrated in FIGS. 5 through 8 is assembled in two steps. First, the threaded stud 66 is screwed into the bore 62 of the shaft 50 until the collar 66a abuts the end surface 61 of the splined shaft 50. The splined plug 52 is then coupled loosely to the splined shaft 50, with the unthreaded end of the stud 66 inserted into the bore 64 of the plug 52. In this regard, the plug 52 is coupled to the splined shaft 50 with a right-hand twisting motion, causing the lugs 54 and 56 of the shaft 50 to interlock with the lugs 58 and 60 of the plug. With the shaft 50 and plug 52 so coupled, the splines of the shaft 50 are in alignment with the splines of the plug 52, as shown in FIG. 7. The combined shaft and plug are then inserted as a unit into the splined bore of a female splined member, such as a hub, gear, or wheel (shown in phantom outline as 68 in FIG. 8). The stud 66 is then screwed out of the threaded bore 62. Access to the stud 66 is by means of an allen wrench inserted through the bore 64 of the plug 52 and engaged in the socket 66d of the collared stud 66. As the stud 66 is screwed out of the threaded bore 62, the collar 66a engages the end surface 63 of the plug 52 and urges the plug 52 away from the splined shaft 50. As the plug 52 is urged away from the splined shaft 50, the sliding engagement between the helically contoured cam surfaces 54a and 58a, and 56a and 60a, causes the plug 52 and the shaft 50 to undergo relative rotation in much the same manner as the splined plug and shaft of the previously described embodiment of FIGS. 1 through 4. The resulting relative rotation of the splined plug 52 and the splined shaft 50 securely locks the splined shaft 50 and plug 52 to the female splined element and eliminates any backlash that might otherwise exist between the splined shaft 50 and the cooperably splined female element. If desired, a belleville washer may be employed on the unthreaded end 66c of the stud 66 to achieve the spring bias described above with respect to the embodiment of FIGS. 1 through 4.

As noted above, the advantage of the embodiment shown in FIGS. 5 through 8 is that the plug 52 cannot fall out of the female member 68 in the event the stud 66 works loose or is inadvertently left untightened during installation. The interlocking lugs prevent separation of the shaft 50 from the plug 52 as long as they are inserted as a unit in the female member 18.

The principle of the invention as set forth in the splined male members thus far described may also be applied to the construction of a splined female member, such as a splined hub or gear. Such an application permits a backlash-free spline connection to be formed with a conventionally splined male member such as a splined shaft. More particularly, a splined female member may likewise be constructed in two splined segments having opposing end surfaces shaped to assume a sliding relationship so as to cause the segments to undergo relative rotation when they are drawn together or, alternatively, drawn apart. FIGS. 9 through 14 illustrate an apparatus having a preferred embodiment of such a segmented female member. The apparatus shown in these FIGURES also includes another alternative embodiment of a segmented male member. Each of these embodiments is described below.

FIGS. 9 through 14 illustrate a particular application of the present invention to a mechanical linkage that forms part of a position-sensing system in an airplane. The function of the position-sensing system is to provide a feedback signal that represents the position of an airfoil, such as the horizontal stabilizer of the airplane. The illustrated mechanical linkage includes a rotatable cable drum 70 that is mechanically coupled via cables 72 to the horizontal stabilizer (not shown). The cable drum 70 rotates in response to swinging movement of the stabilizer. The cable drum 70 includes an integral central hub 74 that is splined to a drum shaft 76 in a manner described in further detail below. The drum shaft 76 is, in turn, splined to an input shaft 78 of a control unit 79, in a manner described below. The control unit 79 includes a shaft angle encoder (not shown) that produces an electrical signal representative of the angle of the input shaft 78, and hence also the angle of the cable drum 70 and the position of the horizontal stabilizer. The electrical signal is applied to a feedback control system that controls the horizontal stabilizer. It will be seen that an electrical signal that accurately represents the position of the horizontal stabilizer can only be obtained so long as there is essentially no backlash in either the spline connection between the cable drum hub 74 and the drum shaft 76, or the spline connection between the drum shaft 76 and the input shaft 78.

The spline connection between the hub 74 of the cable drum 70 and the drum shaft 76 includes a segmented female spline member that comprises the hub 74 and a splined locking ring 80. Referring particularly to FIGS. 10 through 15, the bore of the hub 74 is provided with internal splines 74a at one end that mate with external splines 76a at one end of the drum shaft 76. The opposite end of the bore of the hub 74 is unsplined and is sized to fit snugly over a corresponding unsplined external portion 76c of the drum shaft 76.

Figure 11:
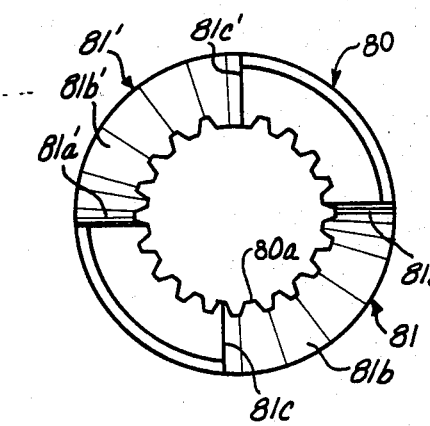
FIG. 11 is an end view of a locking ring that forms part of the assembly shown in FIG. 9, and which is engageable with the splined hub of the cable drum shown in FIG. 10.
Figure 12:
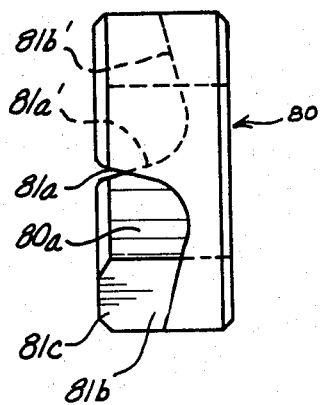
FIG. 12 is a side view of the locking ring of FIG. 11.
Figure 13:
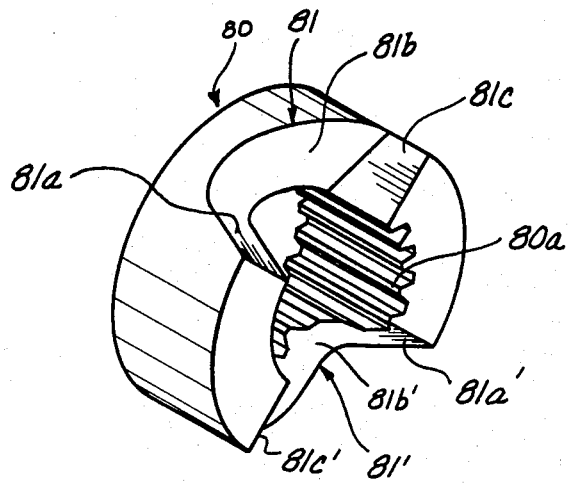
FIG. 13 is an isometric view of the locking ring of FIG. 11.

The splined locking ring 80, illustrated separately in FIGS. 11 through 13, is also splined to the external splines 76a of the drum shaft 76. The locking ring 80 includes internal splines 80a that mate with the internal splines 74a of the hub 74. The locking ring 80 further includes a pair of recesses 81 and 81' that extend axially into one end of the ring 80. The recesses 81 and 81' are positioned diametrically opposite one another across the ring 80 and are symmetrical about the central axis of the ring 80. The recesses 81 and 81' are formed by edgewise milling of the end of the ring 80. More specifically, the recesses 81 and 81' include steeply sloped cam surfaces 81a and 81a', respectively. The recesses 81 and 81' further include less steeply sloped surfaces 81b and 81b', and planar, radially extending surfaces 81c and 81c', respectively. The latter sets of surfaces (81b, 81b', 81c and 81c') are not functional and are primarily a consequence of the milling operation used to form the steeply sloped cam surfaces 81a and 81a'.

The hub 74 likewise includes a pair of recesses 75 and 75' milled into the edge of the splined end of the hub 74. The recesses 75 and 75' have the same shape as the recesses 81 and 81' of the locking ring 80. That is, the recesses 75 and 75' include steeply sloped cam surfaces 75a and 75a', less steeply sloped surfaces 75b and 75b', and planar radial surfaces 75c and 75c'. As with the locking ring 80, the sloped surfaces 75b and 75b' and the planar surfaces 75c, and 75c' are nonfunctional.

When the locking ring 80 is pressed coaxially against the hub 74, the recesses 81 and 81' are engageable with the recesses 75 and 75', respectively. More specifically, the steeply sloped cam surfaces 81a and 81a' of the locking ring 80 are slidably engageable with the steeply sloped surfaces 75a and 75a' of the hub 74, respectively. The low angle of engagement between the cam surfaces 81a and 75a, and 81a' and 75a', causes them to slide past one another and thereby cause the ring 80 and the hub 74 to undergo relative rotation. Such rotation of the ring 80 and hub 74 causes their respective splines 80a and 74a to rotate out of alignment and thereby securely engage the external splines 76a of the drum shaft 76.

It should be noted that the steeply sloped cam surfaces 81a, 81a' and 75a, 75a' may be preferably cut so as to have helically curved contours to obtain precise flush mating of the surfaces 81a and 81a' with the surfaces 75a and 75a', respectively. However, in most applications such precise mating is not essential to the operation of the invention.

Figure 9:
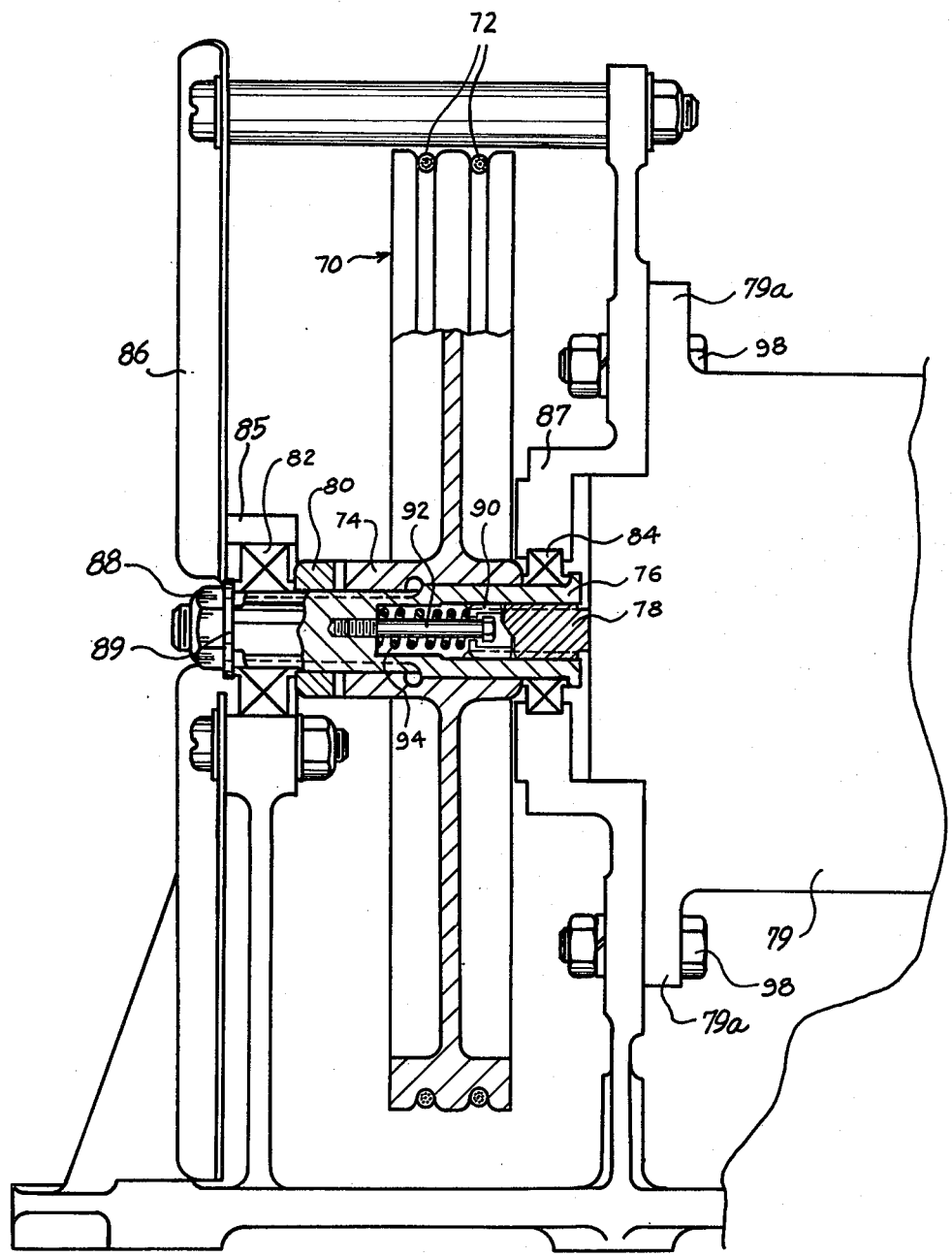
FIG. 9 is a side view in partial cross section of a cable drum assembly that utilizes two embodiments of the present invention; a female splined hub constructed in accordance with the invention and a splined shaft constructed in accordance with an alternative embodiment of the invention.
Figure 10:
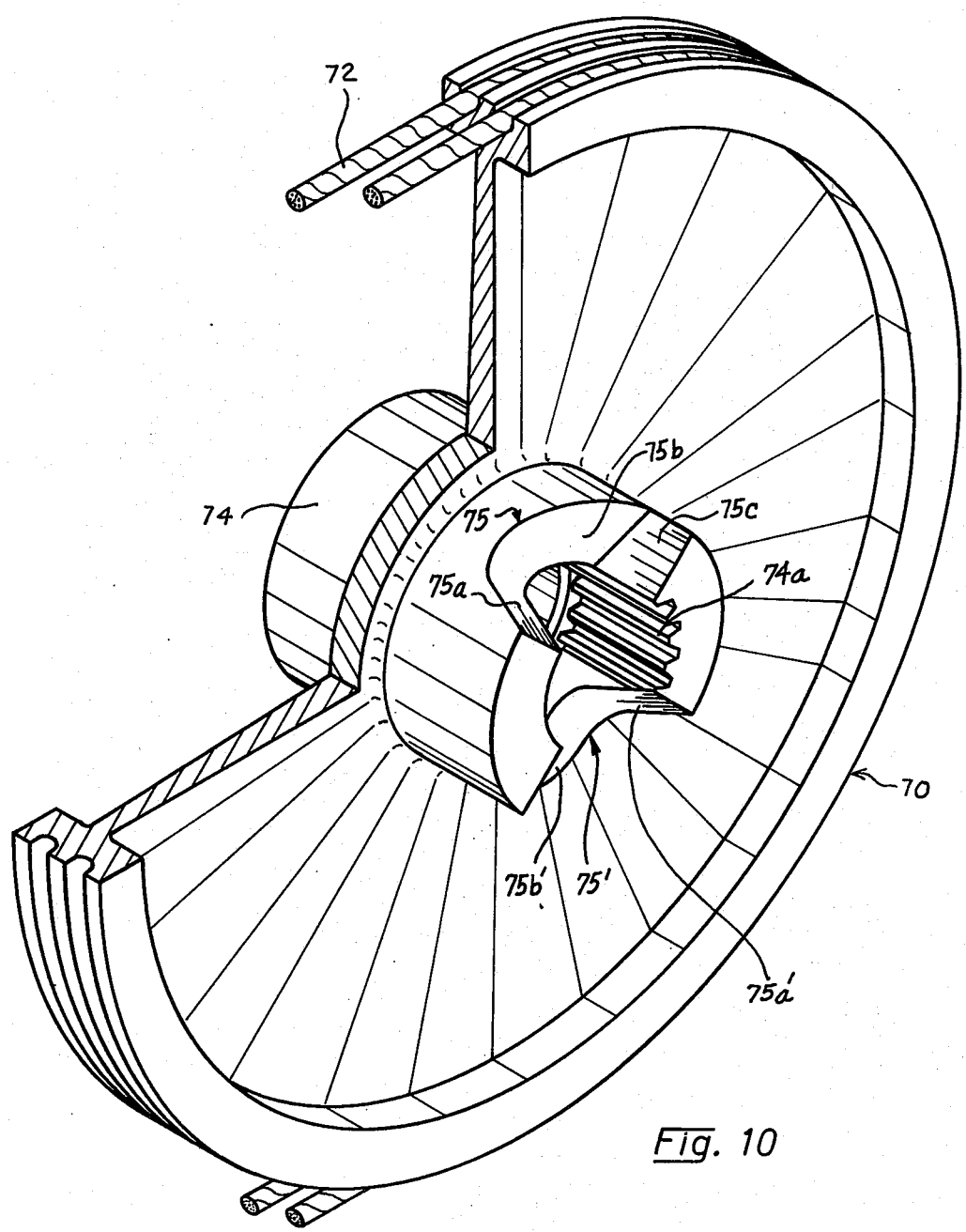
FIG. 10 is an isometric view in partial cross section of the cable drum of FIG. 9, including a splined hub adapted for engagement with a cooperably splined locking ring.

It should also be noted that the steeply sloped cam surfaces 81a and 81a', and 75a and 75a', are ordinarily engaged only over portions of their respective surface areas, such that there is ordinarily a gap between the adjacent end edge of the hub 74 and the end edge of the locking ring 80, as indicated in FIG. 9.

Returning to FIG. 9, the drum shaft 76 is journalled in first and second bearings 82 and 84. The first bearing 82 is mounted for axial sliding motion in a bearing enclosure 85 that forms a part of a fixed frame member 86. The second bearing 84 is fixedly mounted to another fixed frame member 87. The unsplined end 76c of the drum shaft 76 is journalled in bearing 84. The unsplined end 76c of the drum shaft 76 is provided with an outwardly disposed flange 76d that abuts the outside of the second bearing 84. A nut 88 is threaded onto a threaded shaft 76e that extends from the splined end of the drum shaft 76 and through the first bearing 82. A washer 89 is located on the shaft 76e between the nut 88 and the first bearing 82. The nut 88 acts through the washer 89 to urge the bearing 82, the splined locking ring 80, the hub 74, and the bearing 84 against the flange 76d of the drum shaft 76. The axial force applied by the nut 88 and ultimately borne by the flange 76d of the drum shaft 76 is applied through the mutually opposing end surfaces 81a through 81a' and 75a through 75a' of the locking ring 80 and hub 74, respectively. This axial force thus causes the locking ring 80 and hub 74 to undergo relative rotation to securely lock the hub 74 to the drum shaft 76. The torque applied to the nut 88 can be varied to obtain the desired tightness of fit between the hub 74 and the drum shaft 76.

Figure 14:
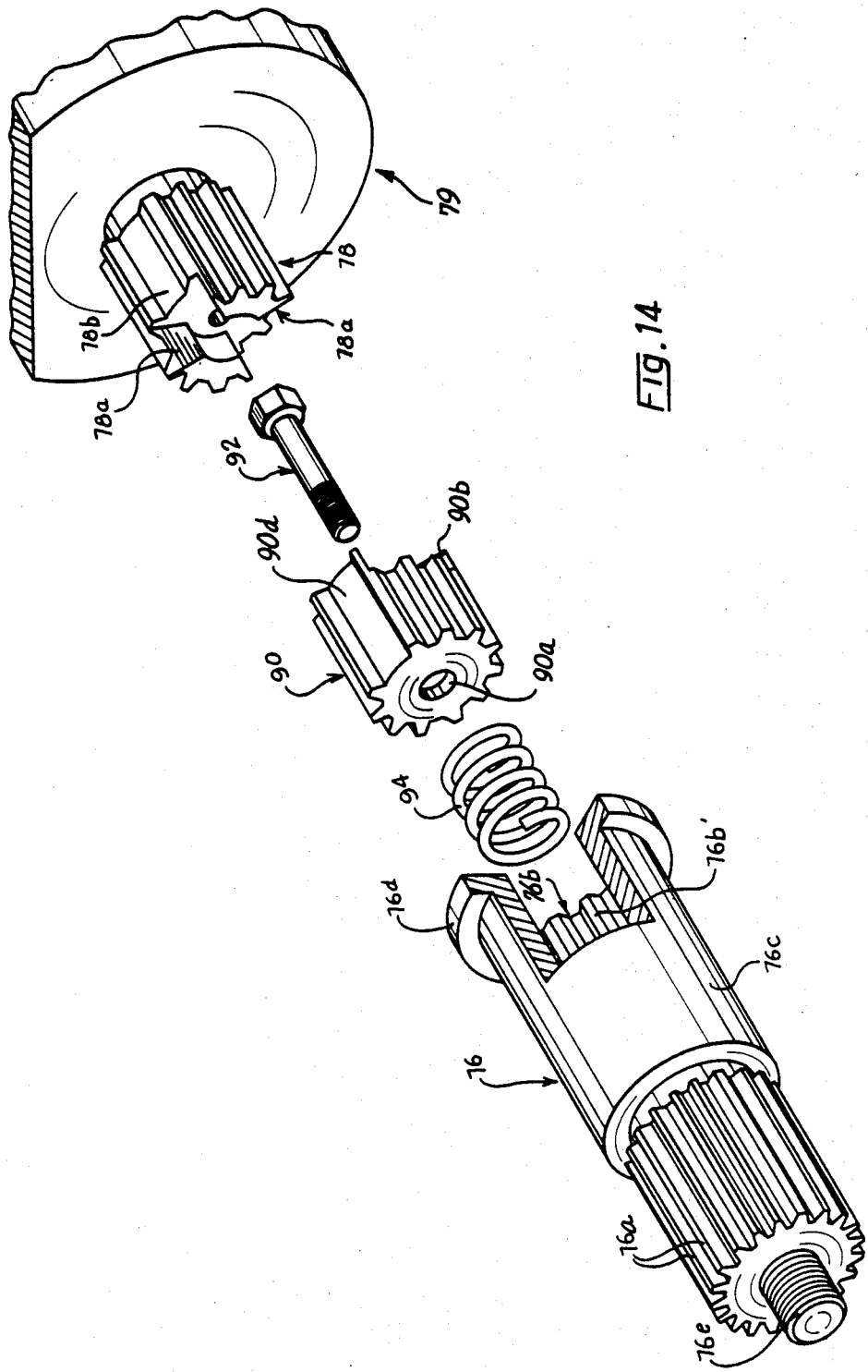
FIG. 14 is an exploded isometric view in partial cross section of a drum shaft, splined plug and splined shaft of the assembly illustrated in FIG. 9.

Referring now to FIGS. 14 and 15, the internally splined bore 76b of the drum shaft 76 is sized to receive the splined input shaft 78 of the control unit 79, as well as a splined plug 90. The plug 90 is normally retained in the bore 76b of the drum shaft 76 by a bolt 92 that extends through a central bore 90a of the plug 90. The bolt 92 is screwed into a threaded bore 76f located at the end of the splined bore 76b of the drum shaft 76. The head 92a of the bolt 92 is set into an axial cavity 90c in the plug 90. A coil compression spring 94 is contained between the base of the drum shaft bore 76b and the splined plug 90. The spring 94 maintains the splined plug 90 urged axially outwardly against the head 92a of the bolt 92 when the input shaft 78 is removed from the bore 76b, and maintains the plug 90 urged against the end of the input shaft 78 when it is inserted in the bore 76b.

The splined plug 90 includes helically contoured end surfaces 90b that slidably engage similarly contoured end surfaces 78a of the input shaft 78. The slidably engaging surfaces 90b and 78a cause the plug 90 and the input shaft 78, when urged together, to undergo relative rotation in the same manner as that described above with respect to the embodiments illustrated in FIGS. 1 through 4.

Referring again to FIG. 9, the control unit 79 from which the input shaft 78 extends is nonrotatable and is ordinarily bolted to the supporting frame member 87 by means of bolts 98 that connect a flange 79a of the control unit 79 to the supporting frame 87. Bolting of the control unit 79 to the frame 87 causes the input shaft 78 to be driven axially into the splined bore 76b of the drum shaft 76 and against the spring-biased plug 90. The input shaft 78 and the splined plug 90 include missing teeth (at 78b and 90d, respectively, as shown in FIG. 14), and the splined bore 76b of the drum shaft 76 includes a filled spline groove (not shown) such that the input shaft 78 and plug 90 are indexed with one another in the drum shaft 76. The input shaft 78 and plug 90 are so indexed in order to properly align the abutting end surfaces 78a and 90b. The force exerted by the compressed spring 94 maintains the splined plug 90 driven firmly against the cooperably engaged input shaft 78. The resulting relative rotation of the splined plug 90 and the input shaft 78 effectively locks the input shaft 78 to the splined bore 76b of the drum shaft 76.

One advantage of the configuration described above is that the splined plug 90 and the compression spring 94 may be permanently bolted into the bore of the drum shaft 76 and may thereafter be left in place when the control unit 79 is removed, for example, for servicing. The plug 90 thus cannot fall out and be lost, nor need it be reinserted and properly positioned each time the control unit 79 is removed. Also, since the splined plug 90 is more or less permanently installed in the bore 76b of the drum shaft 76, routine access to the splined plug 90 and its retaining bolt 92 is not a necessary design consideration for the assembly. The spring-loaded plug 90 automatically eliminates backlash each time the input shaft 78 is installed.

It will be noted that the input shaft 78 bears a substantial axial load due to the force exerted by the compression spring 94. This load is ordinarily borne by suitable end bearings provided at the opposite end of the input shaft 78 (not shown) inside the control unit 79.

Although the present invention is described and illustrated by reference to certain preferred embodiments, various modifications, alterations, and substitutions that may be within the scope of one of ordinary skill in the art may be made without departing from the essential spirit of the invention. Accordingly, the scope of the invention is defined by the following claims.

The embodiments of the invention in which an exclusive property or privilege is claimed are defined as follows:

1. A splined member for reducing backlash in a spline connection, comprising first and second coaxially alignable splined male segments, said splined segments including opposing ends having cam surfaces circumferentially spaced from one another, said cam surfaces being oriented to extend at an obtuse angle with respect to their respective segment ends, such that the cam surfaces of the first segment slidably engage the respective cam surfaces of the second segment so as to cause said segments to undergo relative rotation upon application of an axially directed force tending to draw said segments together, said first segment including a threaded central bore and said second segment including a central through bore, and connecting means connecting said first and second segments and operable to draw said segments together, said connecting means comprising bolt means passing through said central through bore of said second segment and being threadably engageable in said threaded bore of said first segment.

2. The splined member defined in claim 1 wherein said cam surfaces are helically contoured.

3. The splined member defined in claim 2 wherein said first and second segments comprise a splined shaft and a splined plug, respectively.

4. The splined member defined in claim 1 wherein said cam surfaces are helically contoured according to a helix having the same sense of rotation as the threads of said bolt means, such that said second segment and said bolt means rotate in the same direction relative to said first segment as said bolt means is tightened to urge said segments together.

5. A splined member for reducing backlash in a splined connection, comprising first and second coaxially alignable splined female segments, said splined segments including opposing ends having surfaces shaped to engage in sliding relationship so as to cause said segments to undergo relative rotation upon application of an axially directed force between said segments.

6. The splined member defined in claim 5 wherein said surfaces on the ends of each of said segments are cam surfaces that are spaced circumferentially from one another, said cam surfaces being oriented such that the cam surfaces of said first segment slidably engage the respective cam surfaces of said second segment.

7. The splined member defined in claim 6 wherein said cam surfaces of each segment extend at an obtuse angle with respect to the end of said segment such that said segments undergo relative rotation upon application of an axially directed force tending to draw said segments together.

8. The spline member defined in claim 7 wherein said cam surfaces are helically contoured.

9. The splined member defined in claim 7 or 8 further comprising connecting means operable to draw said first and second segments together axially with a selected level of force.

10. The splined member defined in claim 6 wherein said cam surfaces extend at an acute angle with respect to their respective segment ends, such that said first and second segments interlock with one another and undergo relative rotation upon application of an axially directed force tending to draw said segments apart.

11. A splined member for reducing backlash in a splined connection, comprising first and second coaxially alignable splined male segments, said splined segments including opposing ends, each end comprising a plurality of integral arcuate lugs having cam surfaces formed thereon, said cam surfaces being oriented to extend at an acute angle with respect to their respective segment ends, such that said first and second segments interlock with one another through said lugs, and such that said first and second segments undergo relative rotation upon application of an axially directed force tending to draw said segments apart, wherein said first segment includes a threaded central bore and said second segment includes a central bore and further comprising a collared stud for urging said segments apart, said collared stud having a threaded first portion engaged in said threaded bore of said first segment and a second portion slidably engaged in said bore of said second segment, said stud further including an integral collar interposed between said first and second segments, such that said segments are urged apart by screwing said stud out of said threaded bore of said first segment to thereby engage said collar against said second segment and urge said second segment away from said first segment.

12. The splined member defined in claim 11 further comprising bias spring means interposed between said collar of said stud and said second segment.

13. In a spline connection including a splined male member and a co-operably splined female member engaged in splined relationship, the improvement directed to reducing backlash between said members comprising:
a male member formed in first and second coaxially alignable splined segments, said splined segments being engageable as a unit with the female member, said splined segments including mutually opposing ends, each end comprising a plurality of integral, arcuate lugs having cam surfaces formed thereon, said lugs being spaced circumferentially from one another and projecting axially from the segment end, wherein said first segment has a threaded central bore and said cam surfaces extend at an acute angle with respect to their respective segment ends such that said splined segments interlock with one another and undergo relative rotation in reaction to an axially directed force tending to urge said segments apart; and
means for applying a predetermined axially directed force to urge said segments apart to thereby cause said segments to undergo relative rotation that effects misalignment of the splines of said segments and thereby reduces backlash in the spline connection, said means comprises a collared stud engaged in said threaded central bore of said first segment, said stud having an integral collar interposed between said segments, and said second segment including a central bore in which said collared stud is slideably inserted whereby said segments are drawn apart by screwing said stud outward of said threaded bore of said first segment to urge said collar against said second segment to thereby urge said segments apart and effect relation rotation of said segments.

14. The improvement defined in claim 13 wherein said first and second segments comprise a splined shaft and a splined plug.

15. The improvement defined in claim 13 wherein said cam surfaces are helically contoured.

16. The improvement defined in claim 13 further comprising spring means interposed between said collar of said stud and said second splined segment.

17. In a spline connection including a splined male member and a co-operably splined female member engaged in splined relationship, the improvement directed to reducing backlash between said members comprising:
a male member formed in first and second coaxially alignable splined segments, said splined segments being engageable as a unit with the female member, said splined segments including mutually opposing ends, each end comprising a plurality of integral, arculate lugs having cam surfaces formed thereon, said lugs being spaced circumferentially from one another and projecting axially from the segment end, wherein each of said cam surfaces is oriented at an obtuse angle with respect to the end of its respective segment, and wherein said first segment includes a threaded central bore and said second segment includes a central through bore; and
bolt means for applying a predetermined axially directed force to urge said segments apart, said bolt means passing through said bore of said second segment and threadably engaged in said threaded bore of said first segment.

18. The improvement defined in claim 17 further comprising spring means interposed between said second segment and said bolt means, whereby force applied to said second segment by said bolt means is applied through said spring means to thereby provide limited spring-loaded backlash reducing capability to said spline connection.

19. The improvement defined in claim 18 wherein said first and second segments comprise a splined shaft and a splined plug, respectively.

20. The improvement defined in claim 17 or 18 wherein said cam surfaces are helically contoured.

21. In a spline connection including a splined male member and a cooperably splined female member engaged in splined relationship, the improvement directed to reducing backlash between said members comprising:
a female member formed in first and second coaxially alignable splined segments, said splined segments being engageable as a unit with the male member, said splined segments including mutually opposing ends having surfaces shaped to engage in sliding relationship comprising a plurality of circumferentially spaced cam surfaces formed on said opposing ends of said segments, the cam surfaces of said first segment slidably engaging and axially interlocking with the cam surfaces of said second segment so as to cause said splined segments to undergo relative rotation upon application of an axially directed force between said segments; and
means for applying an axially directed force to urge said splined segments apart to thereby cause said segments to undergo relative rotation that effects misalignment of the splines of said segments and thereby reduces backlash in the spline connection.

22. The improvement defined in claim 21 wherein said coaxially alignable splined segments comprise an internally splined ring and an internally splined hub.

23. The improvement defined in claim 22 wherein said cam surfaces are helically contoured.

24. A spline connection substantially free of backlash, comprising a splined male member and a splined female member cooperably engaged in splined relationship, said female member being formed in first and second coaxially alignable splined segments, said splined segments including opposing ends having cam surfaces shaped to engage in sliding relationship so as to cause said segments to undergo relative rotation upon application of an axially directed force between said segments, wherein said first and second segments each include a plurality of cam surfaces spaced circumferentially from one another, said cam surfaces being oriented at an acute angle with respect to their respective segment ends, such that the cam surfaces of said first segment slidably engage and axially interlock with the respective cam surfaces of said second segment, and means for applying axial force between said segments so as to draw said segments apart.

25. The spline connection defined in claim 24 wherein said means for applying a selected axial force acts to draw said segments together, and wherein said cam surfaces of each segment extend at an obtuse angle with respect to the end of said segment such that said segments undergo relative rotation in reaction to said axially directed force tending to draw said segments together.

26. The spline connection defined in claim 24 wherein said cam surfaces extend at an acute angle with respect to their respective segment ends, such that said first and second segments axially interlock with one another and undergo relative rotation upon application of an axially directed force tending to draw said segments apart, and wherein said means for applying a selected axial force includes means for directing such force so as to draw said segments apart.

27. A spline connection substantially free of backlash, comprising a splined male member and a splined female cooperably engageable in splined relationship, said male member being formed in first and second coaxially alignable splined segments, said splined segments including opposing ends having a plurality of cam surfaces spaced circumferentially from one another, said cam surfaces extending at an obtuse angle with respect to their respective segment ends such that said segments undergo relative rotation in reaction to an axially directed force tending to draw said segments together, and means for applying a selected axial force to draw said segments together comprising a threaded central bore in said first segment and a central through bore in said second segment, and bolt means passing through said through bore of said second segment and threadably engaging said threaded bore of said first segment.

28. The spline connection defined in claim 27 further comprising spring bias means interposed between said bolt means and said second segment.

29. A spline connection substantially free of backlash, comprising a splined male member and a splined female member cooperably engageable in splined relationship, said male member being formed in first and second coaxially alignable splined segments, said splined segments including opposing ends having a plurality of cam surfaces spaced circumferentially from one another, said cam surfaces extending at an acute angle with respect to their respective segment ends, such that said first and second segments interlock with one another and undergo relative rotation in reaction to an axially directed force tending to draw said segments apart, and means for applying a selected axial force to draw said segments apart.

30. The spline connection defined in claim 29 wherein said first segment includes a threaded central bore and said second segment includes a central through bore, and wherein said means for applying a selected axial force comprises a collared stud threadably engaged in said threaded bore of said first segment and slidably engaged in said through bore of said first segment, said stud including an integral collar interposed between said first and second segments such that said stud may be screwed out of said threaded bore to drive said second segment away from said first segment and thereby cause said second segment to rotate with respect to said first segment.

31. In a spline connection wherein a splined shaft is engaged in a cooperably splined bore of a female member, a mechanism directed to eliminating backlash between said splined shaft and said female member, comprising a splined plug located in said bore of said female member, said splined shaft and said splined plug having cam surfaces shaped to engage in sliding relationship so as to cause said plug and said splined shaft to undergo relative rotation upon said splined shaft being inserted into said splined bore and urged axially against said splined plug and spring bias means operable to urge said splined plug against said splined shaft upon said splined shaft being inserted into said splined bore.

32. The mechanism defined in claim 31 wherein said bore of said female member terminates at an inner end, and wherein said spring bias means comprises a compression spring located in said bore of said female member between said splined plug and said end surface of said bore, and further comprising means securing said splined plug in said bore and urging said plug against said compression spring.

33. A spline connection substantially free of backlash, comprising a splined male member and a splined female member cooperably engageable in splined relationship, said male member being formed in first and second coaxially alignable splined segments, said splined segments including opposing ends having cam surfaces shaped to engage in sliding relationship so as to cause said segments to undergo relative rotation upon application of an axially directed force tending to draw said segments apart, and connecting means connecting said first and second segments, said connecting means being operable to draw said segments apart axially with a selected level of force.

34. The spline connection define in claim 33, wherein said cam surfaces extend at an acute angle with respect to their respective segment ends, such that said first and second segments interlock with one another and undergo relative rotation in reaction to said axially directed force tending to draw said segments apart.

35. The spline connection defined in claim 34 wherein said first and second segments include central bores, and wherein said connecting means is positioned within said bores.

36. A splined member for reducing backlash in a spline connection, comprising:
first and second coaxially alignable splined male segments, said splined segments including opposing ends having cam surfaces circumferentially spaced from one another, said cam surfaces being oriented to extend at an obtuse angle with respect to their respective segment ends, such that the cam surfaces of the first segment slidably engage the respective cam surfaces of the second segment so as to cause said segments to undergo relative rotation upon application of an axially directed force tending to draw said segments together, said first and second segments including centrals bores; and connecting means connecting said first and second segments, the connecting means being positioned within said bores and operable to draw said segments together.

37. A splined member for reducing backlash in a spline connection, comprising first and second coaxially alignable splined male segments, said splined segments including opposing ends having cam surfaces circumferentially spaced from one another, said cam surfaces being oriented to extend at an obtuse angle with respect to their respective segment ends, such that the cam surfaces of the first segment slidably engage the respective cam surfaces of the second segment so as to cause said segments to undergo relative rotation upon application of an axially directed force tending to draw said segments together, and connecting means connecting said first and second segments and operable to draw said segments together, said connecting means comprising spring bias means associated with said connecting means for urging said segments together with a spring-biasing force.

* * * * *

UNITED STATES PATENT AND TRADEMARK OFFICE
CERTIFICATE OF CORRECTION

PATENT NO. : 4,473,317
DATED : September 25, 1984
INVENTOR(S) : Per A. Bolang

It is certified that error appears in the above-identified patent and that said Letters Patent is hereby corrected as shown below:

| Column 6, | line 2: | "can" should be --cam--. |
| Column 6, | line 61: | "be" should be --by--. |
| Column 9, | line 58: | "recesses81" should be --recesses 81--. |
| Column 13, | line 62: | "relation" should be --relative--. |
| Column 17, | line 3: | "centrals" should be --central--. |

Signed and Sealed this

Thirtieth Day of April 1985

[SEAL]

Attest:

DONALD J. QUIGG

*Attesting Officer*    *Acting Commissioner of Patents and Trademarks*